(12) United States Patent
Kinoshita et al.

(10) Patent No.: US 9,387,993 B2
(45) Date of Patent: Jul. 12, 2016

(54) CONVEYOR APPARATUS (71) Applicant: NISSAN MOTOR CO., LTD., Yokohama-shi, Kanagawa (JP)

(72) Inventors: Masafumi Kinoshita, Chigasaki (JP); Toshiaki Ohrui, Ebina (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/439,554

(22) PCT Filed: Oct. 2, 2013

(86) PCT No.: PCT/JP2013/076876
§ 371 (c)(1),
(2) Date: Apr. 29, 2015

(87) PCT Pub. No.: WO2014/069152
PCT Pub. Date: May 8, 2014

(65) Prior Publication Data
US 2015/0314967 A1 Nov. 5, 2015

(30) Foreign Application Priority Data

Oct. 30, 2012 (JP) .................. 2012-239481

(51) Int. Cl.
*B65G 49/00* (2006.01)
*B65G 57/04* (2006.01)
*H05F 3/00* (2006.01)
*H01M 10/04* (2006.01)
*H01M 6/00* (2006.01)
*H01M 2/16* (2006.01)
*H01M 2/18* (2006.01)

(52) U.S. Cl.
CPC ............... *B65G 49/00* (2013.01); *B65G 57/04* (2013.01); *H01M 2/1673* (2013.01); *H01M 2/18* (2013.01); *H01M 6/005* (2013.01); *H01M 10/0404* (2013.01); *H05F 3/00* (2013.01)

(58) Field of Classification Search
CPC ............ H01M 10/0404; H01M 6/005; H01M 2/1673; H01M 2/18; H05F 3/00; B65G 49/00; B65G 57/04; B65G 47/525; B65G 57/03; B65G 2201/0238
USPC .................................................. 198/493, 955
See application file for complete search history.

(56) References Cited

U.S. PATENT DOCUMENTS 7,905,195 B2 * 3/2011 Yamasaki ......... H01L 21/67784
118/300
2009/0272624 A1 * 11/2009 Edwards ................. B07C 5/363
198/370.11

(Continued)

FOREIGN PATENT DOCUMENTS

JP 3-122973 A 5/1991
JP 7-302616 A 11/1995

(Continued)

*Primary Examiner* — Mark A Deuble
(74) *Attorney, Agent, or Firm* — Foley & Lardner LLP (57) ABSTRACT

To provide a conveyor apparatus that is capable of performing an operation of a bagged electrode with the bagged electrode being in a non-expanding state.
A conveyor apparatus 1 conveys a bagged electrode 100 that is formed by sandwiching an electrode 110 by a pair of separators 120, 130 and by partly welding an outer circumference of the pair of separators 120, 130. The conveyor apparatus 1 has a conveyor unit 10, an operating unit and an air-blowing unit 20. The conveyor unit 10 conveys the bagged electrode 100 while holding the bagged electrode 100. The operating unit performs an operation of the exposed bagged electrode 100 at a part of a conveyor line of the conveyor unit 10. The air-blowing unit 20 blows toward a surface that is an opposite side to a held surface of the bagged electrode 100.

7 Claims, 5 Drawing Sheets

(56) References Cited

U.S. PATENT DOCUMENTS

2015/0013720 A1* 1/2015 Yasooka ........... H01M 10/0404
134/6
2015/0129107 A1* 5/2015 Miyazaki ................ H01M 4/04
156/64

FOREIGN PATENT DOCUMENTS

| JP | 2000-215870 A | 8/2000 |
|---|---|---|
| JP | 2012-101901 A | 5/2012 |
| WO | WO 2012/137902 A1 | 10/2012 |
| WO | WO 2012/137903 A1 | 10/2012 |

* cited by examiner

FIG.8B

CONVEYOR APPARATUS

TECHNICAL FIELD

The present invention relates to a conveyor apparatus that conveys a bagged electrode.

BACKGROUND ART

In a related art, there has been an electric device formed by covering an electrode stack (a layered electrode unit) with a laminate sheet that is an outer packaging member. The electrode stack is formed by arranging positive and negative electrodes in layers through a separator.

From the viewpoint of productivity of the electric device, a bagged electrode (or a packaged electrode) obtained by packaging one of the positive and negative electrodes in a pair of separators is widely used. For instance, the bagged electrode obtained by packaging the positive electrode in the pair of separators and the negative electrode are alternately arranged in layers, then the electrode stack is formed.

Here, the bagged electrode is formed not by welding the whole circumference of the separator along four sides of the separator, but, in general, by partly welding the four sides of the separator (for instance, see Patent Document 1).

CITATION LIST

Patent Document

Patent Document 1: Japanese Patent Provisional Publication Tokkai No. 7-302616

SUMMARY OF THE INVENTION

Technical Problem

In a configuration of the Patent Document 1, however, there is a cases where, when conveying the bagged electrode by a belt conveyor, air enters a gap between an upper separator of the pair of upper and lower separators and the electrode, then the upper separator swells or expands. The air enters the gap from a part of the separator where the upper and lower separators are not welded. When the bagged electrode is conveyed with the separator expanding and an operation is made to the bagged electrode, a desirable goal may not be achieved.

The present invention was made to solve the above technical problem, and an object of the present invention is to provide a conveyor apparatus that is capable of performing the operation of the bagged electrode with the separator being in a non-expanding state.

Solution to Problem

A conveyor apparatus of the present invention to achieve the above object conveys a bagged electrode that is formed by sandwiching an electrode by a pair of separators and by partly welding an outer circumference of the pair of separators. The conveyor apparatus has a conveyor unit, an operating unit and an air-blowing unit. The conveyor unit conveys the bagged electrode while holding the bagged electrode. The operating unit performs an operation of the exposed bagged electrode at a part of a conveyor line of the conveyor unit. The air-blowing unit blows toward a surface that is an opposite side to a held surface of the bagged electrode.

DESCRIPTION OF EMBODIMENTS

In the following description, first to third embodiments of the present invention will be explained with reference to the drawings. In the explanation of the drawings, the same element or component is denoted by the same reference sign, and overlapping explanation is omitted. For convenience in explanation, a size or a ratio of each element or component in the drawings might be different from an actual size or an actual ratio.

First Embodiment

A conveyor apparatus 1 according to a first embodiment will be explained with reference to FIGS. 1 to 6D.

Figure 1:
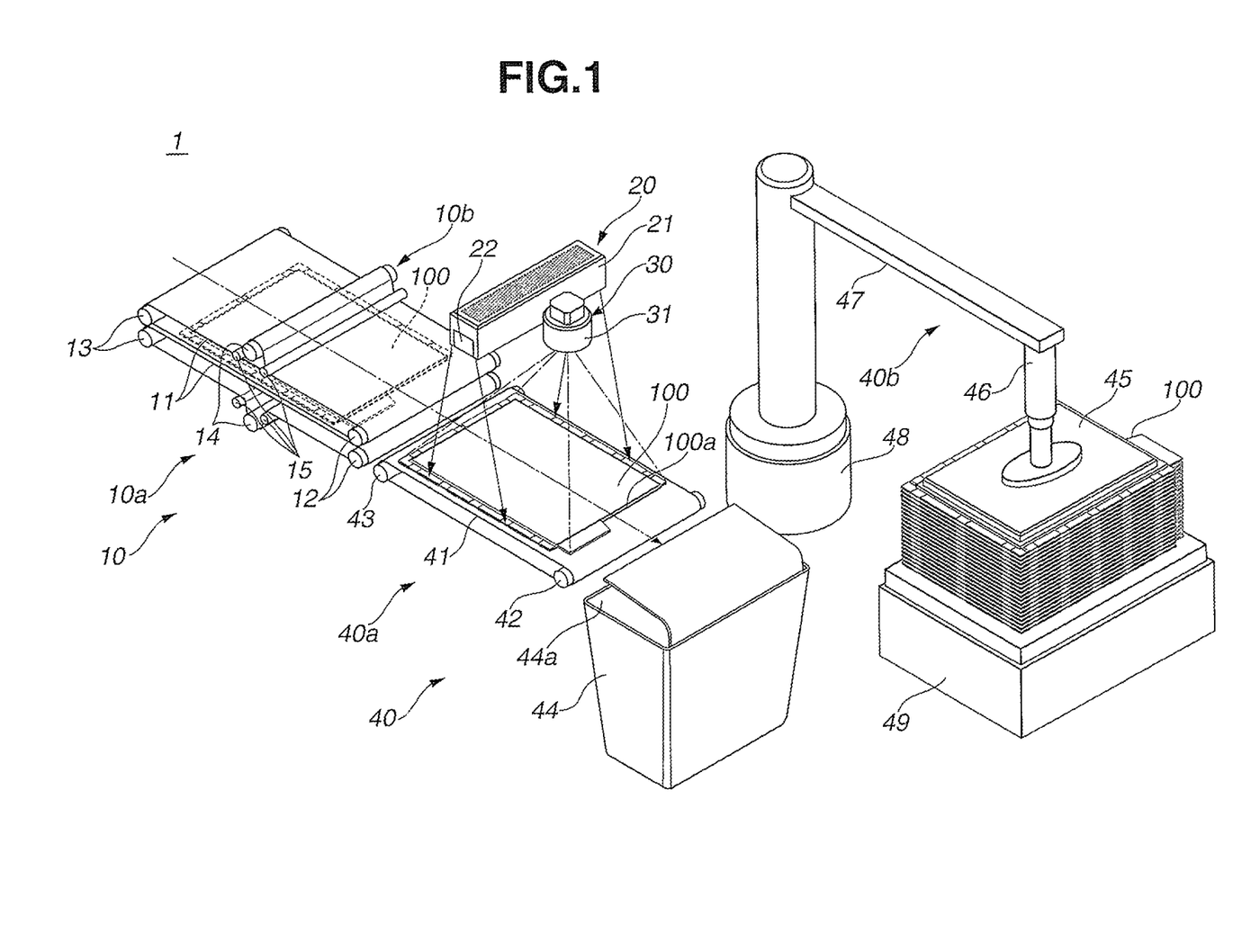
FIG. 1 is a perspective view showing a conveyor apparatus according to a first embodiment.
Figure 2:
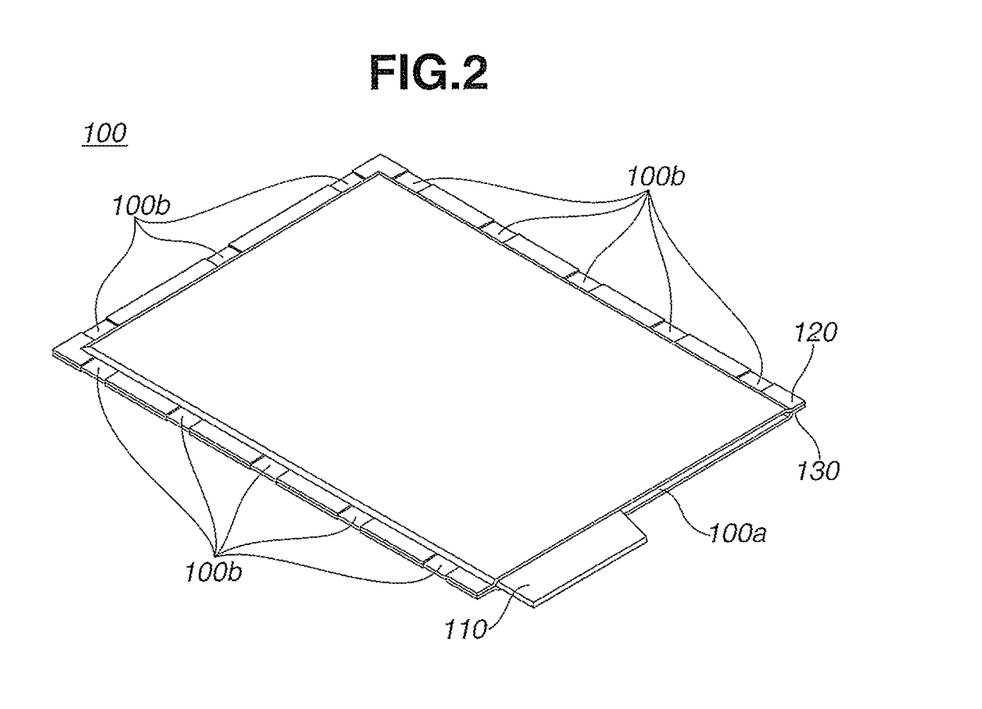
FIG. 2 is a perspective view showing a bagged electrode conveyed by the conveyor apparatus of the first embodiment.
Figure 3:
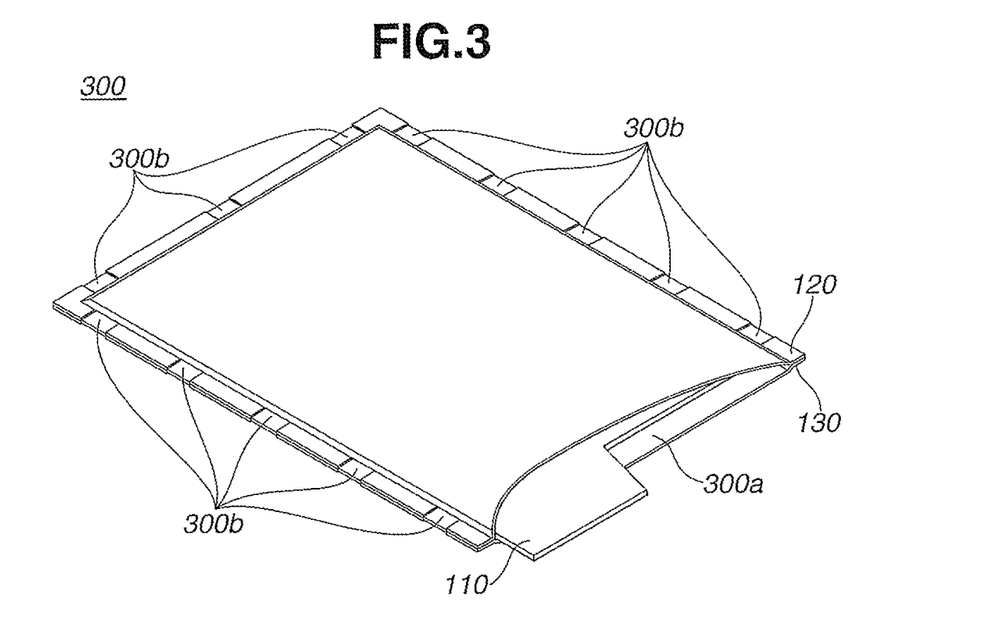
FIG. 3 is a perspective view showing a bagged electrode conveyed by a conveyor apparatus of a comparative example.
Figure 4:
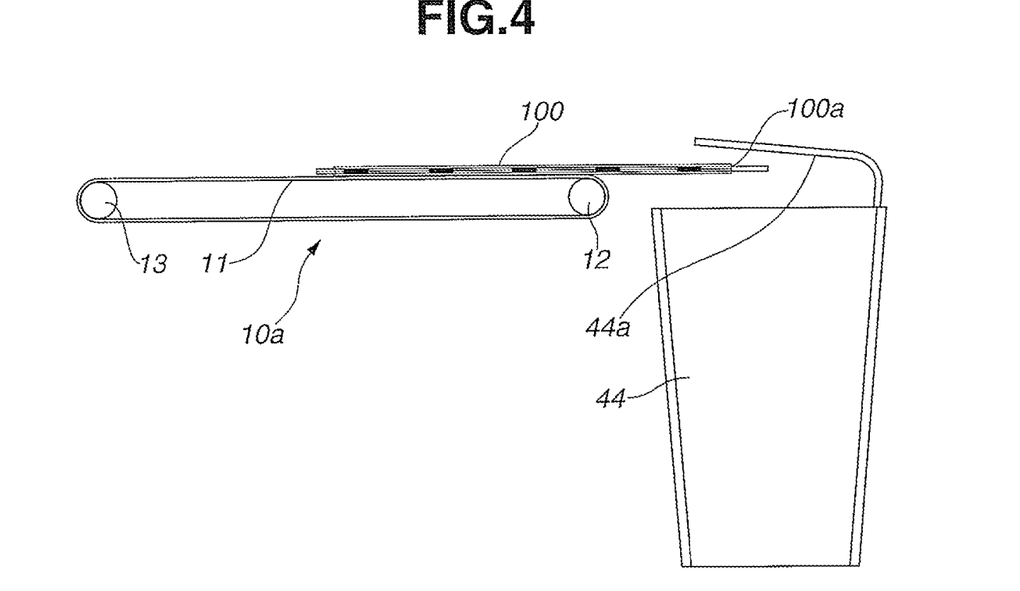
FIG. 4 is a side view showing a defective bagged electrode that is conveyed and rejected by the conveyor apparatus of the first embodiment.
Figure 5:
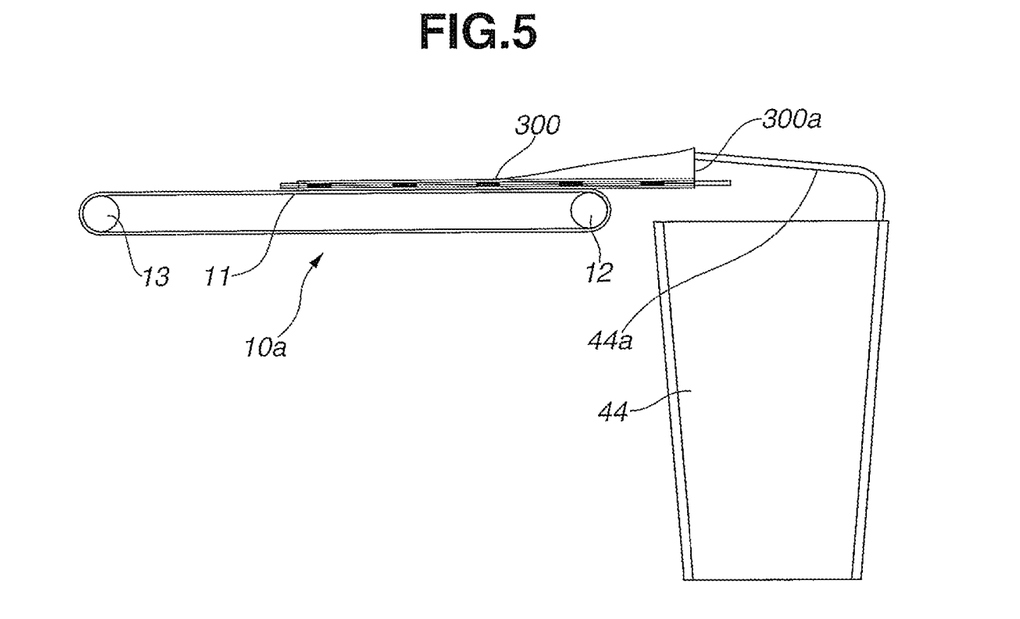
FIG. 5 is a side view showing a defective bagged electrode that is conveyed and rejected by the comparative example.

FIG. 1 is a perspective view showing the conveyor apparatus 1. FIG. 2 is a perspective view showing a bagged electrode (or a packaged electrode) 100 conveyed by the conveyor apparatus 1. FIG. 3 is a perspective view showing a bagged electrode 300 conveyed by a conveyor apparatus of a comparative example. FIG. 4 is a side view showing a defective bagged electrode 100 that is conveyed and rejected by the conveyor apparatus 1. FIG. 5 is a side view showing a defective bagged electrode 300 that is conveyed and rejected by the comparative example. FIGS. 6A to 6D show a variety of bagged electrodes conveyed by the conveyor apparatus 1.

The conveyor apparatus 1 has, as shown in FIG. 1, a conveyor unit 10, an air-blowing unit 20 and an operating unit (a shooting unit 30 and a transferring unit 40). The conveyor apparatus 1 performs the operation of the bagged electrode 100 whose separator 120 is in a non-expanding state. The bagged electrode 100 conveyed by the conveyor apparatus 1 is formed by sandwiching an electrode 110 by a pair of separators 120 and 130 and by partly welding an outer circumference of the pair of separators 120 and 130.

The conveyor unit 10 conveys the bagged electrode 100 while holding the bagged electrode 100.

As shown in FIG. 1, the conveyor unit 10 has opposing lower and upper belt conveyors 10a and 10b, and conveys the bagged electrode 100 while holding the bagged electrode 100 so as to sandwich the bagged electrode 100 between the lower and upper belt conveyors 10a and 10b. The lower belt conveyor 10a and the upper belt conveyor 10b each have a conveyor belt 11, a driving roller 12, a driven roller 13, a tension roller 14 and a pair of auxiliary rollers 15.

The conveyor belt 11 is an endless belt, and the driving roller 12 is disposed at one end of an inner circumferential surface of the conveyor belt 11, and the driven roller 13 is disposed at the other end of the inner circumferential surface of the conveyor belt 11. The conveyor belt 11 is driven by rotation of the driving roller 12, and conveys the bagged electrode 100. The driving roller 12 is connected to a motor (not shown), and rotates at a predetermined rotation speed. The driven roller 13 is rotated by the rotation of the driving roller 12. The tension roller 14 is located at some midpoint between the driving roller 12 and the driven roller 13, and disposed at the inner circumferential surface of the conveyor belt 11. The pair of auxiliary rollers 15 are set so as to face the tension roller 14 and be made in contact with an outer circumferential surface of the conveyor belt 11. The pair of auxiliary rollers 15 are separate from each other along a drive direction of the conveyor belt 11. The tension roller 14 provides a constant tension to the conveyor belt 11. The conveyor belt 11 conveys the bagged electrode 100 by an area where the tension roller 14 is not disposed.

The operating unit performs the operation of the exposed bagged electrode 100 at a part of a conveyor line of the conveyor unit 10. The operating unit is provided with at least one of the shooting unit 30 and the transferring unit 40. In the first embodiment, both of the shooting unit 30 and the transferring unit 40 are provided in the operating unit, and this case will be explained.

The shooting unit 30 shoots the bagged electrode 100 from a side facing a held surface of the bagged electrode 100.

The held surface is, for instance, a surface, which faces the conveyor belt 11 mounting and conveying the bagged electrode 100, of the bagged electrode 100. More specifically, the held surface corresponds to a lower surface side of the lower separator 130 as shown in FIG. 2.

The shooting unit 30 is provided with a CCD camera 31, as shown in FIG. 1. The CCD camera 31 shoots the bagged electrode 100 from above, and obtains an image of the bagged electrode 100. As a resolution of the CCD camera 31, for instance, a resolution of a few tens of micrometers (μm)~1 mm is selected according to required measurement precision. The shooting unit 30 measures outer dimensions of the separator 120 from the image shot by the CCD camera 31 by a controller (not shown). Further, the shooting unit 30 can measure or sense a position of an edge portion of the electrode 110 through the separator 120 by the controller. The controller measures the outer dimensions of the separator 120, and if its measurement result falls within a predetermined specification range, the controller judges to be a pass. On the other hand, if the measurement result is out of the predetermined specification range, the controller judges to be a failure (or a rejection). In a case where the controller measures or senses the position of the edge portion of the electrode 110 of the bagged electrode 100, the after-mentioned transferring unit 40 transfers the bagged electrode 100 so that, on the bases of the measurement result, a relative position of the bagged electrode 100, which is stacked, does not shift. The controller could be mounted inside the shooting unit 30, or might be provided externally.

The transferring unit 40 transfers the bagged electrode 100 to a different position from the conveyor line of the conveyor unit 10. The transferring unit 40 is provided with at least one of a mounting transfer section 40a and a suction transfer section 40b. In the first embodiment, both of the mounting transfer section 40a and the suction transfer section 40b are provided in the transferring unit 40, and this case will be explained.

The mounting transfer section 40a transfers the bagged electrode 100 while mounting thereon the bagged electrode 100.

For instance, as shown in FIG. 1, the mounting transfer section 40a transfers the bagged electrode 100 that is judged to be the failure by the shooting unit 30 while mounting thereon the bagged electrode 100. The mounting transfer section 40a is provided at a downstream side in a conveying direction of the bagged electrode 100 with respect to the conveyor unit 10. The above mentioned shooting unit 30 and the after-mentioned air-blowing unit 20 are located above the mounting transfer section 40a. The mounting transfer section 40a has a transfer belt 41, a driving roller 42 and a driven roller 43. The transfer belt 41 is an endless belt, and the driving roller 42 is disposed at one end of an inner circumferential surface of the transfer belt 41, and the driven roller 43 is disposed at the other end of the inner circumferential surface of the transfer belt 41. The transfer belt 41 is driven by rotation of the driving roller 42, and conveys the bagged electrode 100. The driving roller 42 is connected to a motor (not shown), and rotates at a predetermined rotation speed. The driven roller 43 is rotated by the rotation of the driving roller 42.

The mounting transfer section 40a is provided with an ejection chute 44. The ejection chute 44 corresponds to a storage unit. The ejection chute 44 has a slot 44a. For instance, the ejection chute 44 temporarily stores the bagged electrode 100 that is judged to be the failure by the shooting unit 30. The mounting transfer section 40a drives the transfer belt 41 and transfers the bagged electrode 100, then throws or drops the bagged electrode 100 into the ejection chute 44 from the slot 44a. The ejection chute 44 is made of, for instance, hard plastic, and is formed into a box shape. The slot 44a of the ejection chute 44 is located close to an end at a downstream side in the conveying direction of the transfer belt 41. The bagged electrode 100 temporarily stored in the ejection chute 44 is carried to a waste storage space at regular time intervals.

Regarding the defective bagged electrode 100 conveyed and thrown into the ejection chute 44 by the conveyor apparatus 1 of the first embodiment, as shown in FIG. 2, since an opening 100a of the bagged electrode 100 does not swell or expand, the defective bagged electrode 100 (the opening 100a) does not interfere with the slot 44a of the ejection chute 44 as shown in FIG. 4. On the other hand, regarding the defective bagged electrode 300 conveyed and rejected by the comparative example, as shown in FIG. 3, since an opening 300a of the bagged electrode 300 swells or expands, the defective bagged electrode 300 (the opening 300a) interferes with and clogs the slot 44a of the ejection chute 44 as shown in FIG. 5.

The suction transfer section 40b transfers the bagged electrode 100 while sucking the bagged electrode 100.

For instance, as shown in FIG. 1, the suction transfer section 40b transfers the bagged electrode 100 that is judged to be the pass by the shooting unit 30 while sucking the bagged electrode 100. The suction transfer section 40b is provided at the downstream side in the conveying direction of the bagged electrode 100 with respect to the conveyor unit 10 so as to be adjacent to the mounting transfer section 40a. The suction transfer section 40b has a suction member 45, an expansion member (or a telescopic member) 46, a hanging rotation member 47, a supporting member 48 and a mounting stage 49. The suction member 45 has a plate shape, and is provided with a plurality of suction openings on a surface that touches or is made in contact with the bagged electrode 100. The telescopic member 46 is cylindrical in shape, and can extend and retract, for instance, by power of an air compressor (not shown). The telescopic member 46 is connected to an upper portion of the suction member 45. The hanging rotation member 47 is joined to an upper end of the telescopic member 46. The hanging rotation member 47 rotates with the supporting member 48 being a center, for instance, by power of a motor (not shown). The supporting member 48 is set on a floor surface, and rotatably supports the hanging rotation member 47. The mounting stage 49 temporarily mounts thereon a non-defective bagged electrode 100 while stacking the non-defective bagged electrode 100.

The air-blowing unit 20 blows toward a surface that is an opposite side to the held surface of the bagged electrode 100.

As mentioned above, the held surface corresponds to the lower surface side of the lower separator 130 as shown in FIG. 2. Therefore, the opposite surface to the held surface corresponds to an upper surface side of the separator 120 as shown in FIG. 2, which is a surface that does not touch the electrode 110.

The air-blowing unit 20 has, as shown in FIG. 1, a blower fan 21 and an ionizer 22. The blower fan 21 is set above the transfer belt 41 so as to be adjacent to the CCD camera of the after-mentioned shooting unit 30. The blower fan 21 blows on the bagged electrode 100. The ionizer 22 corresponds to a static electricity removal unit. The ionizer 22 is provided, for instance, at the blower fan 21. The ionizer 22 generates ion in the air, and neutralizes static electricity in the air by the generated ion.

Figure 6A:
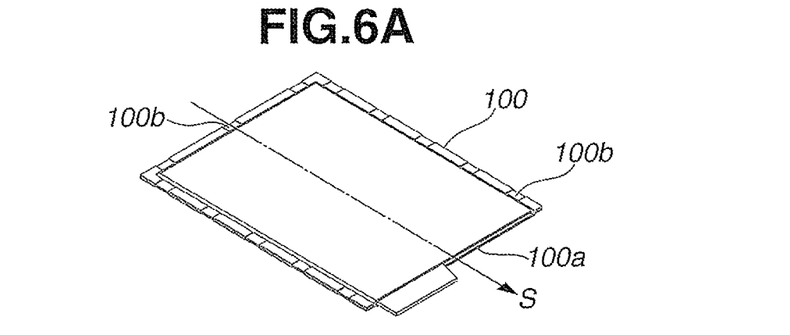
FIGS. 6A to 6D show a variety of bagged electrodes conveyed by the conveyor apparatus of the first embodiment.
Figure 6B:
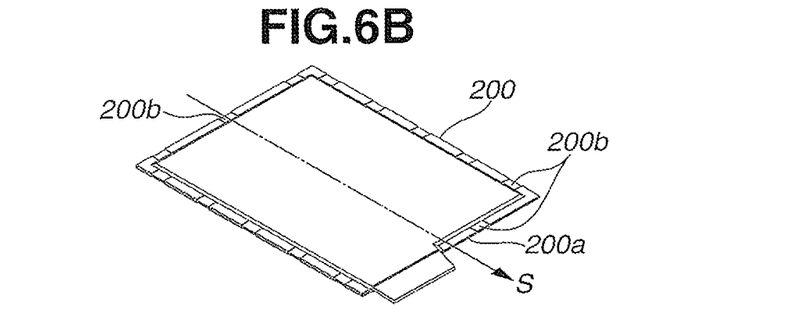

A variety of bagged electrodes conveyed by the conveyor apparatus 1 are shown in FIGS. 6A to 6D. FIG. 6A is a case where the bagged electrode 100 is arranged so that the opening 100a points to a downstream side in a conveying direction S, which is a case where the air enters a gap between the upper separator and the electrode from the opening 100a during the conveyance, then the upper separator is likely to swell or expand. That is, this case is a most suitable case to suppress the expansion of the upper separator of the bagged electrode 100 by using the air-blowing unit 20. FIG. 6B is a case where a bagged electrode 200 is arranged so that an opening 200a points to the downstream side in the conveying direction S. However, since one welding portion 200b is provided at the opening 200a, it is hard for the air to enter the gap between the upper separator and the electrode from the opening 200a during the conveyance, and the upper separator is unlikely to swell or expand. Even so, this case is a case where the expansion of the upper separator of the bagged electrode 200 can be suppressed by using the air-blowing unit 20.

Figure 6C:
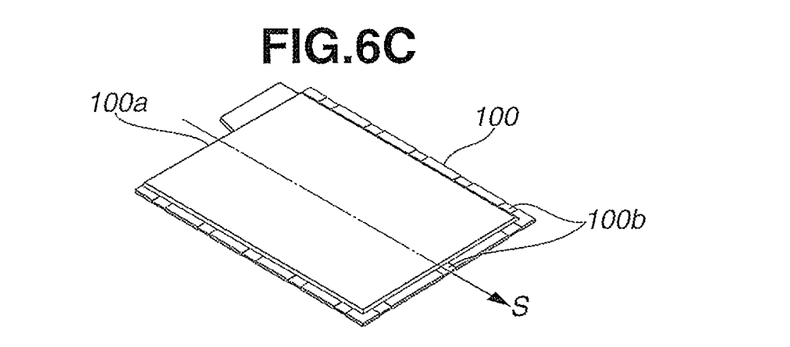
Figure 6D:
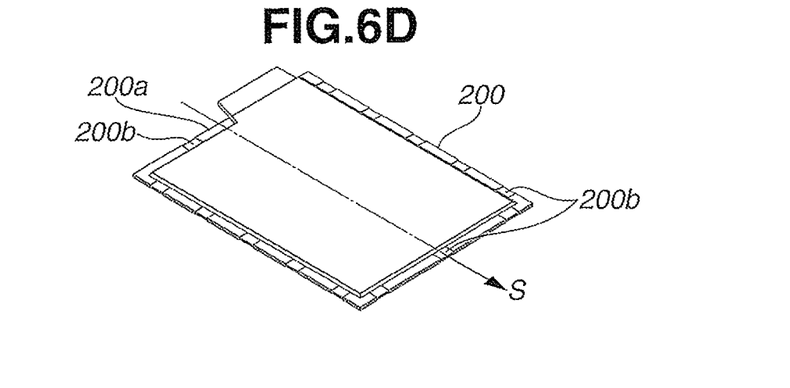

FIG. 6C is a case where the bagged electrode 100 is arranged so that the opening 100a points to an upstream side in the conveying direction S and also a welding portion 100b is provided at the downstream side in the conveying direction S, which is a case where it is hard for the air to enter the gap between the upper separator and the electrode from the opening 100a during the conveyance, and the upper separator is unlikely to swell or expand. Even so, this case is a case where the expansion of the upper separator of the bagged electrode 100 can be suppressed by using the air-blowing unit 20. FIG. 6D is a case where the bagged electrode 200 is arranged so that the opening 200a points to the upstream side in the conveying direction S and also one welding portion 200b is provided at the downstream side in the conveying direction S and further one welding portion 200b is provided at the opening 200a. For this reason, in the case of the bagged electrode 200 shown in FIG. 6D, it is quite hard for the air to enter the gap between the upper separator and the electrode from the opening 200a during the conveyance, and the upper separator is most unlikely to swell or expand. Even so, this case is a case where the expansion of the upper separator of the bagged electrode 200 can be suppressed by using the air-blowing unit 20.

According to the conveyor apparatus 1 of the first embodiment described above, the following operation and effect are obtained.

The conveyor apparatus 1 conveys the bagged electrode 100 that is formed by sandwiching the electrode 110 by the pair of separators 120, 130 and by partly welding the outer circumference of the pair of separators 120, 130. The conveyor apparatus 1 has the conveyor unit 10, the operating unit and the air-blowing unit 20. The conveyor unit 10 conveys the bagged electrode 100 while holding the bagged electrode 100. The operating unit performs the operation of the exposed bagged electrode 100 at a part of the conveyor line of the conveyor unit 10. The air-blowing unit 20 blows toward the surface that is the opposite side to the held surface of the bagged electrode 100.

According to the conveyor apparatus 1 having such configuration, the air-blowing unit 20 blows toward the opposite surface to the held surface of the bagged electrode 100. Therefore, the operating unit can perform the operation of the bagged electrode 100 whose separator 120 is in the non-expanding state.

Further, with this configuration, since the electrode 110 and the separator 120, which form the bagged electrode 100, are brought into intimate contact with each other by the blow, it is possible to prevent the separator 120 from interfering with components disposed in a conveying process. Thus, an operating rate of the conveyance of the bagged electrode 100 by the conveyor apparatus 1 can be improved. The components disposed in the conveying process correspond to components that form the conveyor apparatus 1, components that are provided closed to the conveyor apparatus 1 and a side wall that separates off the conveyor apparatus 1.

Moreover, with this configuration, since the conveyor apparatus 1 conveys the bagged electrode 100 with the separator 120 being in the non-expanding state, it is possible to avoid an occurrence of creases on the separator 120 etc. As a consequence, quality of the bagged electrode 100 conveyed and undergoing the operation by the conveyor apparatus 1 can be improved.

The operating unit could have at least one of the shooting unit 30 and the transferring unit 40. The shooting unit 30 shoots the bagged electrode 100 from the side facing the held surface of the bagged electrode 100. The transferring unit 40 transfers the bagged electrode 100 to the different position from the conveyor line of the conveyor unit 10.

According to the conveyor apparatus 1 having such configuration, the shooting unit 30 can shoot the outer dimensions of the separator 120 with the separator 120 of the bagged electrode 100 being in the non-expanding state with great precision. Consequently, a non-defective rate of the bagged electrode 100 can be improved. On the other hand, since the opening 100a of the bagged electrode 100 is in the non-expanding state when being conveyed, the transferring unit 40 can transfer the bagged electrode 100 without interference with other components.

The air-blowing unit 20 could have the static electricity removal unit. The static electricity removal unit removes static electricity charged to the bagged electrode 100 and static electricity existing in the air around the bagged electrode 100.

According to the conveyor apparatus 1 having such configuration, the static electricity generated at the bagged electrode 100 during the conveyance of the bagged electrode 100 can be removed using the static electricity removal unit. That is, it is possible to prevent a hole or a crack from occurring or appearing on a surface of the separator 120 etc. of the bagged electrode 100 due to electrical discharge caused by the static electricity.

The transferring unit 40 could have at least one of the mounting transfer section 40a and the suction transfer section 40b. The mounting transfer section 40a transfers the bagged electrode 100 while mounting thereon the bagged electrode 100. The suction transfer section 40b transfers the bagged electrode 100 while sucking the bagged electrode 100.

According to the conveyor apparatus 1 having such configuration, since the opening 100a of the bagged electrode 100 is brought into the non-expanding state during the transfer of the bagged electrode 100, the mounting transfer section 40a can transfer the bagged electrode 100 without the interference of the separator 120 with other components. On the other hand, since the opening 100a of the bagged electrode 100 is brought into the non-expanding state, the suction transfer section 40b can transfer the bagged electrode 100 while sufficiently sucking the separator 120 of the bagged electrode 100. That is, it is possible to prevent the non-defective bagged electrode 100 from falling when being transferred and sucked by the suction member 45, and prevent the operation of the conveyor apparatus 1 from stopping.

The transferring unit 40 could have the ejection chute 44. The ejection chute 44 has the slot 44a, and temporarily stores the bagged electrode 100. The transferring unit 40 throws or drops the bagged electrode 100 into the ejection chute 44 from the slot 44a.

According to the conveyor apparatus 1 having such configuration, since the opening 100a of the bagged electrode 100 is brought into the non-expanding state, it is possible to prevent the separator 120 of the bagged electrode 100 from being snagged on the slot 44a of the ejection chute 44. That is, it is possible to prevent the defective bagged electrode 100 from clogging the slot 44a of the ejection chute 44, and prevent the operation of the conveyor apparatus 1 from stopping.

Second Embodiment

The conveyor apparatus according to a second embodiment will be explained with reference to FIG. 7.

Figure 7:
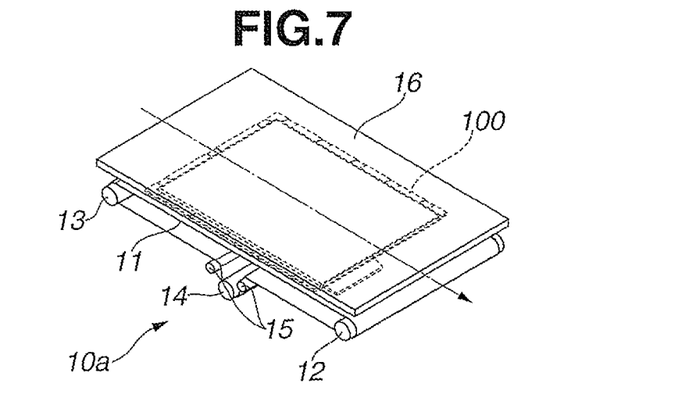
FIG. 7 is a perspective view showing a main part of a conveyor apparatus according to a second embodiment.

FIG. 7 is a perspective view showing a main part of the conveyor apparatus according to the second embodiment.

In the conveyor apparatus of the second embodiment, a shielding wall 16 is provided at the conveyor unit 10. This configuration is different from that of the conveyor apparatus 1 of the first embodiment described above.

In the second embodiment, the same component or element as that of the first embodiment is denoted by the same reference sign, and overlapping explanation is omitted.

As shown in FIG. 7, instead of the pair of lower and upper belt conveyors 10a and 10b, the shielding wall 16 is provided at an upper side of the lower belt conveyor 10a, and the conveyor apparatus conveys the bagged electrode 100 by the lower belt conveyor 10a. The shielding wall 16 is arranged so as to cover the separator 120 of the conveyed bagged electrode 100.

According to the conveyor apparatus of the second embodiment, in addition to the effect of the first embodiment, the following operation and effect are further obtained.

In the configuration of the second embodiment, the air-blowing unit 20 blows on a shooting area of the shooting unit 30, and the conveyor unit 10 conveys the bagged electrode 100 while covering both surfaces of the bagged electrode 100 at an upstream side in the conveying direction of the bagged electrode 100 with respect to the shooting area.

According to the conveyor apparatus having such configuration, since the air-blowing unit 20 blows only on the shooting area of the bagged electrode 100 shot by the shooting unit 30, a manufacturing cost associated with the air-blowing unit 20 can be suppressed, and also reduction in size of the conveyor apparatus 1 is possible. Further, since the both surfaces of the bagged electrode 100 are covered in an area where the bagged electrode is not shot by the shooting unit 30, the separator 120 of the bagged electrode 100 can be prevented from swelling or expanding.

In the conveyor apparatus of the second embodiment, in order to greatly simplify the configuration of the conveyor unit 10 in an area except the shooting area shot by the shooting unit 30, only the shielding wall 16 is provided over the bagged electrode 100. Thus, the same effects as those of the conveyor apparatus 1 of the first embodiment described above can be obtained.

Third Embodiment

The conveyor apparatus according to a third embodiment will be explained with reference to FIGS. 8A and 8B.

Figure 8A:
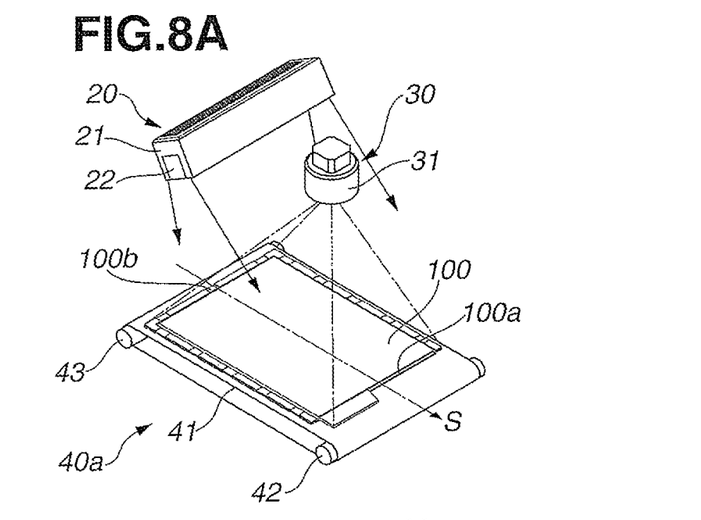
FIGS. 8A and 8B are perspective views each showing a main part of a conveyor apparatus according to a third embodiment.
Figure 8B:
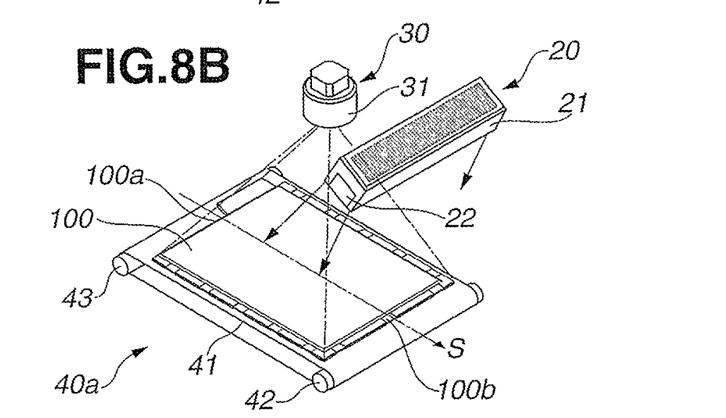

FIGS. 8A and 8B are perspective views each showing a main part of the conveyor apparatus according to the third embodiment.

In the conveyor apparatus of the third embodiment, the air-blowing unit 20 blows toward the downstream side or the upstream side in the conveying direction of the bagged electrode 100. This configuration is different from that of the conveyor apparatus 1 of the first embodiment described above.

In the third embodiment, the same component or element as that of the first embodiment is denoted by the same reference sign, and overlapping explanation is omitted.

In the conveyor apparatus, the air-blowing unit 20 shown in FIG. 8A blows toward the downstream side in the conveying direction S of the bagged electrode 100. That is, the air-blowing unit 20 is arranged with the air-blowing unit 20 rotating by a predetermined angle in a counterclockwise direction with respect to a position of the air-blowing unit 20 shown in FIG. 1. In a case of this arrangement of the air-blowing unit 20, the conveyor unit 10 conveys the bagged electrode 100 with the opening 100a being positioned at the downstream side in the conveying direction of the bagged electrode 100. More specifically, this is applied to the bagged electrode 100 shown in FIG. 6A and the bagged electrode 200 shown in FIG. 6B. That is, for instance, the air-blowing unit 20 blows from an opposite side to the opening 100a of the bagged electrode 100 to a direction toward the opening 100a. With this configuration or arrangement, the air trapped in the bagged electrode 100 or the separator 120 can be expelled or released (or removed) effectively through the opening 100a or 200a.

On the other hand, the air-blowing unit 20 shown in FIG. 8B blows toward the upstream side in the conveying direction S of the bagged electrode 100. That is, the air-blowing unit 20 is arranged with the air-blowing unit 20 rotating by a predetermined angle in a clockwise direction with respect to the position of the air-blowing unit 20 shown in FIG. 1. In a case of this arrangement of the air-blowing unit 20, the conveyor unit 10 conveys the bagged electrode 100 with the opening 100a being positioned at the upstream side in the conveying direction of the bagged electrode 100. More specifically, this is applied to the bagged electrode 100 shown in FIG. 6C and the bagged electrode 200 shown in FIG. 6D. That is, for instance, the air-blowing unit 20 blows from an opposite side to the opening 100a of the bagged electrode 100 to a direction toward the opening 100a. With this configuration or arrangement, the air trapped in the bagged electrode 100 or the separator 120 can be expelled or released (or removed) effectively through the opening 100a or 200a.

According to the conveyor apparatus of the third embodiment, in addition to the effects of the first embodiment and the second embodiment, the following operation and effect are further obtained.

The conveyor unit 10 conveys the bagged electrode 100 with the opening 100a being disposed (or positioned) at the downstream side or the upstream side in the conveying direction of the bagged electrode 100. The air-blowing unit 20 blows on the bagged electrode 100 whose opening 100a is positioned at the downstream side in the conveying direction toward the downstream side in the conveying direction of the bagged electrode 100. On the other hand, the air-blowing unit 20 could blow on the bagged electrode 100 whose opening 100a is positioned at the upstream side in the conveying direction toward the upstream side in the conveying direction of the bagged electrode 100.

According to the conveyor apparatus having such configuration, for instance, in a case where the air is trapped or present between the electrode 110 and the separator 120, which form the bagged electrode 100, and the separator 120 swells or expands, the trapped air can be expelled or released (or removed) toward the opening 100a of the bagged electrode 100. That is, by blowing on the bagged electrode 100 from the opposite side to the opening 100a of the bagged electrode 100 to the direction toward the opening 100a, the air trapped in the bagged electrode 100 can be expelled or released (or removed) effectively from the opening 100a without being held trapped in the bagged electrode 100.

In addition to the above embodiments, the present invention includes all design modifications and equivalents belonging to the technical scope of the present invention.

For instance, a manner of conveying the bagged electrode 100 is not limited to a belt-conveying manner. It could be a sucking manner. It is possible to employ a configuration that blows on the bagged electrode 100 from a lower side of the bagged electrode 100 while sucking the bagged electrode 100 from an upper side of the bagged electrode 100, in the conveyor unit 10.

The non-defective bagged electrode 100 could be transferred while being mounted by a unit corresponding to the mounting transfer section 40a. The defective bagged electrode 100 could be transferred while being sucked by a unit corresponding to the suction transfer section 40b. The number of welding points and a welding position at the bagged electrode 100 are not especially limited. For instance, the welding portions could be provided only at the opposing two sides of the bagged electrode 100.

This application is based on a prior Japanese Patent Application No. 2012-239481 filed on Oct. 30, 2012. The entire contents of this Japanese Patent Application No. 2012-239481 are hereby incorporated by reference.

EXPLANATION OF REFERENCE

1 . . . conveyor apparatus
10 . . . conveyor unit
10a . . . lower belt conveyor
10b . . . upper belt conveyor
11 . . . conveyor belt
12 . . . driving roller
13 . . . driven roller
14 . . . tension roller
15 . . . auxiliary roller
16 . . . shielding wall
20 . . . air-blowing unit
21 . . . blower fan
22 . . . ionizer (corresponding to static electricity removal unit)
30 . . . shooting unit (one example of operating unit)
31 . . . camera
40 . . . transferring unit (the other example of operating unit)
40a . . . mounting transfer section
40b . . . suction transfer section
41 . . . transfer belt
42 . . . driving roller
43 . . . driven roller
44 . . . ejection chute (corresponding to storage unit)
44a . . . slot
45 . . . suction member
46 . . . expansion member
47 . . . hanging rotation member
48 . . . supporting member
49 . . . mounting stage
100, 200, 300 . . . bagged electrode
100a, 200a, 300a . . . opening
100b, 200b, 300b . . . welding portion
110 . . . electrode
120, 130 . . . separator

The invention claimed is:

1. A conveyor apparatus conveying a bagged electrode that is formed by sandwiching an electrode by a pair of separators and by partly welding an outer circumference of the pair of separators, the conveyor apparatus comprising:
a conveyor unit conveying the bagged electrode while holding the bagged electrode;
an operating unit performing an operation of the exposed bagged electrode at a part of a conveyor line of the conveyor unit; and
an air-blowing unit blowing toward a surface that is an opposite side to a held surface of the bagged electrode.

2. The conveyor apparatus as claimed in claim 1, wherein:
the operating unit has at least one of a shooting unit that shoots the bagged electrode from a side facing the held surface of the bagged electrode and a transferring unit that transfers the bagged electrode to a different position from the conveyor line of the conveyor unit.

3. The conveyor apparatus as claimed in claim 1, wherein:
the air-blowing unit has a static electricity removal unit that removes static electricity charged to the bagged electrode.

4. The conveyor apparatus as claimed in claim 2, wherein:
the air-blowing unit blows on a shooting area of the shooting unit, and
the conveyor unit conveys the bagged electrode while covering both surfaces of the bagged electrode at an upstream side in a conveying direction of the bagged electrode with respect to the shooting area.

5. The conveyor apparatus as claimed in claim 2, wherein:
the transferring unit has at least one of a mounting transfer section that transfers the bagged electrode while mounting thereon the bagged electrode and a suction transfer section that transfers the bagged electrode while sucking the bagged electrode.

6. The conveyor apparatus as claimed in claim 2, wherein:
the transferring unit has a storage unit that has a slot and temporarily stores the bagged electrode, and
the transferring unit drops the bagged electrode into the storage unit from the slot.

7. The conveyor apparatus as claimed in claim 1, wherein:
the conveyor unit conveys the bagged electrode with an opening being disposed at a downstream side or an upstream side in a conveying direction of the bagged electrode, the air-blowing unit blows on the bagged electrode whose opening is positioned at the downstream side in the conveying direction of the bagged electrode to a direction toward the downstream side of the bagged electrode, and the air-blowing unit blows on the bagged electrode whose opening is positioned at the upstream side in the conveying direction of the bagged electrode to a direction toward the upstream side of the bagged electrode.

* * * * *